United States Patent [19]
Chennupaty et al.

[11] Patent Number: 6,014,735
[45] Date of Patent: Jan. 11, 2000

[54] INSTRUCTION SET EXTENSION USING PREFIXES

[75] Inventors: Srinivas Chennupaty; Lance Hacking; Thomas Huff; Patrice L. Roussel; Shreekant S. Thakkar, all of Portland, Oreg.

[73] Assignee: Intel Corporation, Santa Clara, Calif.

[21] Appl. No.: 09/053,391

[22] Filed: Mar. 31, 1998

[51] Int. Cl.[7] .................................................. G06F 9/30
[52] U.S. Cl. .................................................. 712/210
[58] Field of Search .......................... 712/210, 208, 712/209, 211, 212, 213

[56] References Cited

U.S. PATENT DOCUMENTS

| | | | |
|---|---|---|---|
| 5,353,420 | 10/1994 | Zaidi ..................................... | 712/210 |
| 5,572,206 | 11/1996 | Miller et al. .......................... | 341/51 |
| 5,619,666 | 4/1997 | Coon et al. ........................... | 712/208 |
| 5,822,559 | 10/1998 | Narayan et al. ...................... | 712/214 |
| 5,845,102 | 12/1998 | Miller et al. ......................... | 712/211 |

OTHER PUBLICATIONS

Visual Instruction Set (VIS) User's Guide, Sun Microsystems, Version 1.1, Mar. 1997, pp. i–xii, 1–127.
AMD–3D Technology Manual, Advance Micro Devices, (AMD), Feb. 1998, pp. i–x, 1–58.

*Primary Examiner*—William M. Treat
*Attorney, Agent, or Firm*—Blakely, Sokoloff, Taylor & Zafman LLP

[57] ABSTRACT

The present invention discloses a method and apparatus for encoding an instruction in an instruction set which uses a prefix code to qualify an existing opcode of an existing instruction. An opcode and an escape code are selected. The escape code is selected such that it is different from the prefix code and the existing opcode. The opcode, the escape code, and the prefix code are combined to generate an instruction code which uniquely represents the operation performed by the instruction.

20 Claims, 5 Drawing Sheets

INSTRUCTION SET EXTENSION USING PREFIXES

BACKGROUND OF THE INVENTION

1. Field of the Invention

This invention relates to microprocessor systems. In particular, the invention relates to instruction set extension using prefixes.

2. Description of Related Art

Microprocessor technology has evolved over the years at a fast rate. Advances in computer architecture and semiconductor technology have created many opportunities to design new processors. There are typically two options for designing new processors: (1) defining a completely new architecture, and (2) extending the current architecture to accommodate new features. Each option has both advantages and disadvantages. However, when a processor has captured a significant market segment, option (2) offers many attractive advantages. The main advantage of extending the current architecture is the compatibility with current and earlier models. The disadvantages include the problems of getting out of the constraints imposed by the earlier designs.

New processors involve new features in both hardware and software. A new processor based on existing design typically has an additional set of instructions that can take advantage of the new hardware design. However, extending an instruction set by adding a new set of instructions is a challenging problem because of the constraints in the encoding of the instructions.

When an instruction set is originally developed, the typical approach is to encode the instructions with a minimum number of bits to leave room for future expansion. However, as the architecture evolves and becomes more and more mature, more and more instructions are defined. Eventually, there will be a point where there is no more space for encoding the instructions.

One solution to the problem is to eliminate some of the older instructions. However, this solution reduces the compatibility to the earlier processors. Software written for the earlier processors may not work for the new design. Another solution is to narrow the new instruction set to only a group of selective instructions to accommodate the little room left in the available opcode table. The solution results in poorer performance because it sacrifices many advanced features offered by the new design. Yet, another solution is to define a set of new opcodes which is different than the existing opcodes. The problems with this solution include the complexity of the decoding circuitry which occupies a large chip area and may not scale well with the processor frequency.

Therefore there is a need in the technology to provide an efficient method for extending an instruction set without increasing hardware complexity.

SUMMARY OF THE INVENTION

The present invention discloses a method and apparatus for encoding an instruction in an instruction set which uses a prefix code to qualify an existing opcode of an existing instruction. An opcode and an escape code are selected. The escape code is selected such that it is different from the prefix code and the existing opcode. The opcode, the escape code, and the prefix code are combined to generate an instruction code which uniquely represents the operation performed by the instruction.

BRIEF DESCRIPTION OF THE DRAWINGS

The features and advantages of the invention will become apparent from the following detailed description of the invention in which.

DESCRIPTION OF THE PRESENT INVENTION

A method and apparatus for extending an instruction set using prefixes is disclosed. The method uses a set of existing prefix codes to define a new set of instructions. The method provides a fast and efficient mechanism to decode the new instruction set.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention. In the following description, the notation 0x indicates the number that follows is in hexadecimal format.

Figure 1:
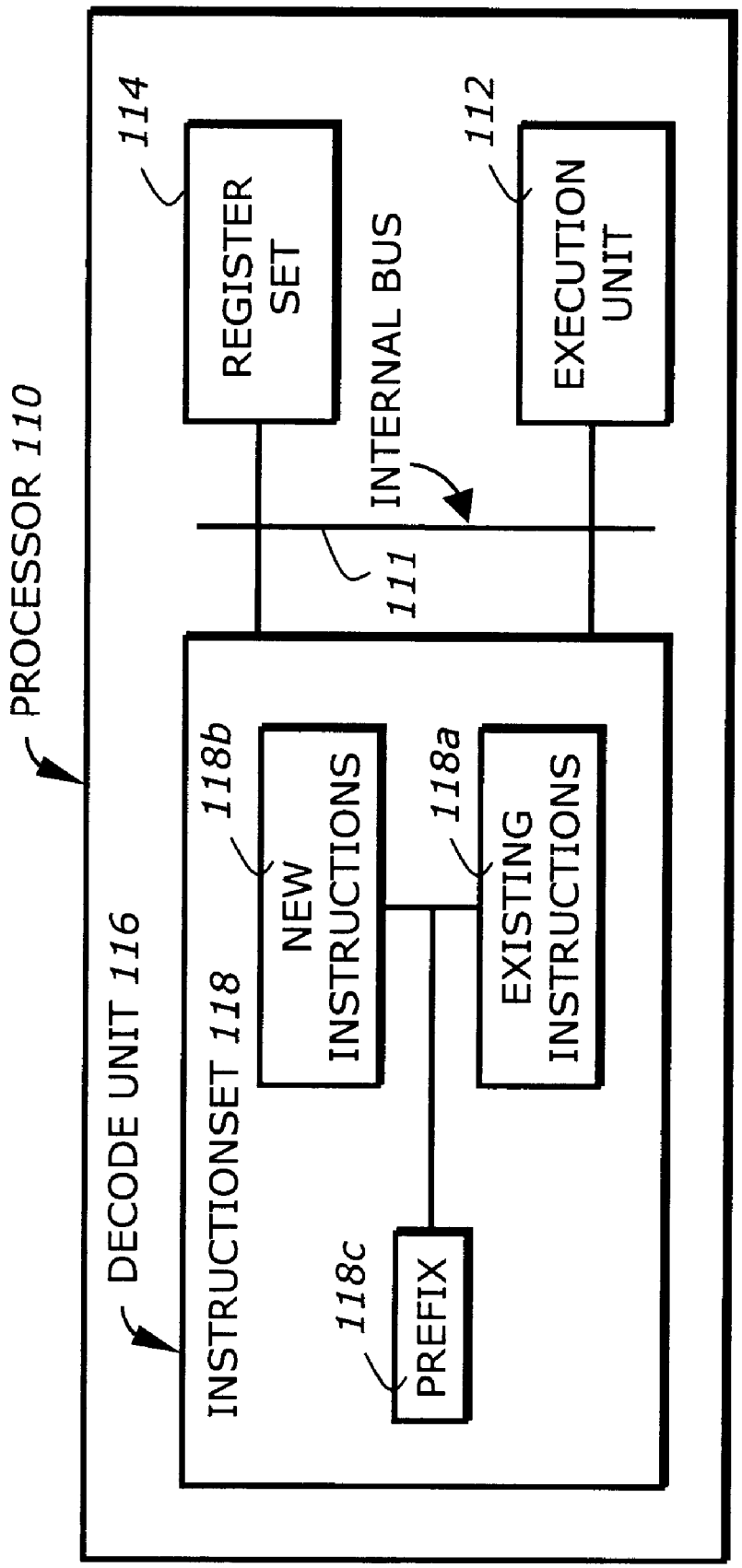
FIG. 1 is a diagram illustrating one embodiment of a computer system 100 in accordance with the teachings of the present invention.

FIG. 1 is a diagram illustrating one embodiment of a processor 110 in accordance with the teachings of the present invention.

The processor 110 represents a central processing unit of any type of architecture, such as complex instruction set computers (CISC), reduced instruction set computers (RISC), very long instruction word (VLIW), multi-threaded or hybrid architecture.

FIG. 1 illustrates that the processor 110 includes a decode unit 116, a set of registers 114, an execution unit 112, and an internal bus 111 for executing instructions. Of course, the processor 110 contains additional circuitry, which is not necessary to understanding the invention. The decode unit 116, registers 114 and execution unit 112 are coupled together by the internal bus 111. The decode unit 116 is used for decoding instructions received by processor 110 into control signals and/or microcode entry points. In response to these control signals and/or microcode entry points, the execution unit 112 performs the appropriate operations. The decode unit 116 may be implemented using any number of different mechanisms (e.g., a look-up table, a hardware implementation, a PLA, etc.).

The decode unit 116 is shown including an instruction set 118 for performing operations on scalar and packed data. The number format for these operations can be any convenient format, including single-precision, double-precision, and extended floating-point numbers, signed and unsigned integers, and non-numeric data. The instruction set 118 includes an existing instruction set 118*a*, a new instruction set 118*b*. In particular, the instruction format of the instruction set includes a prefix 118*c*.

Instruction Format

Figure 2:
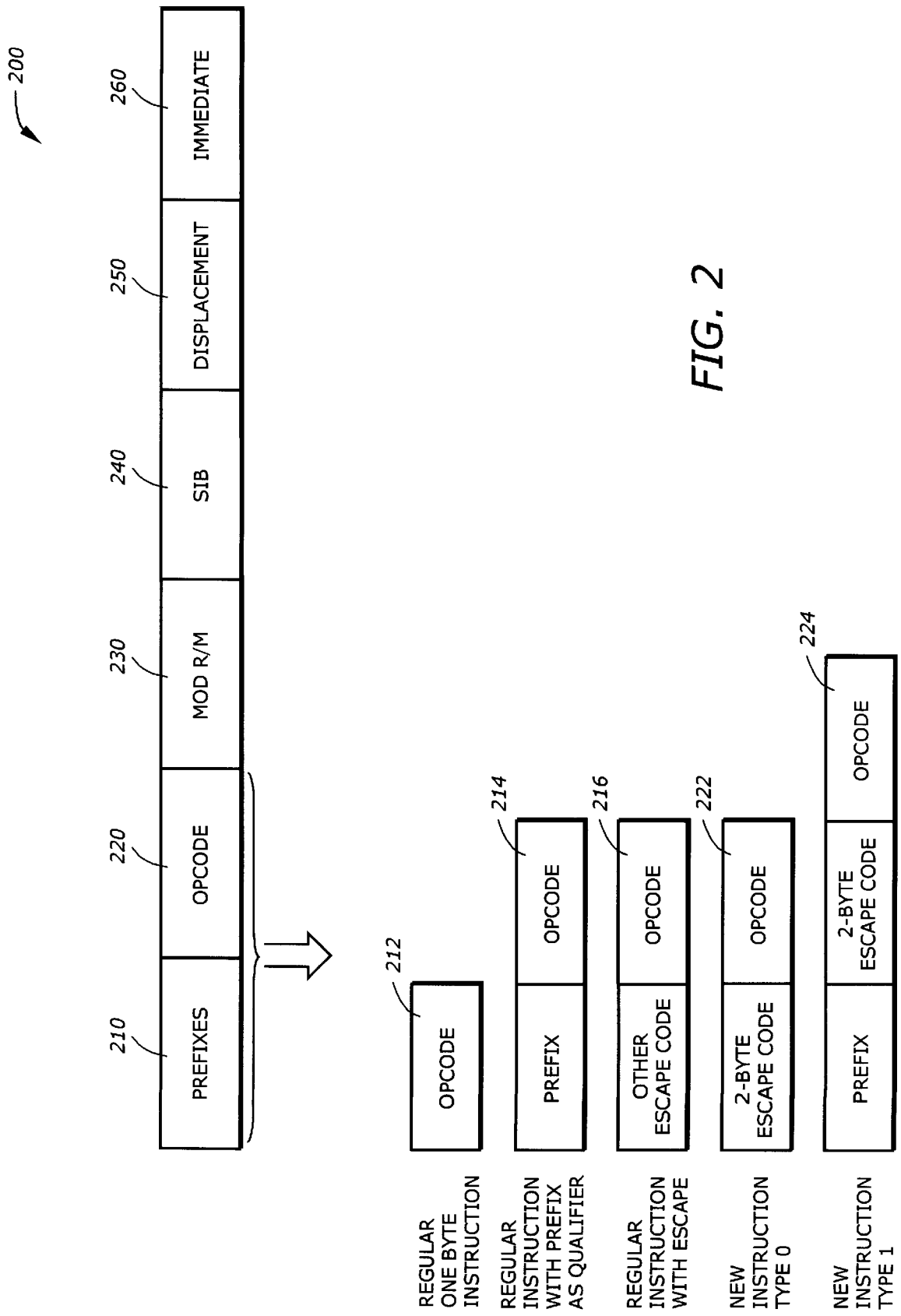
FIG. 2 is a diagram illustrating a format of an instruction 200 in according to one embodiment of the invention.

FIG. 2 is a diagram illustrating a format of an instruction 200 according to one embodiment of the invention. The instruction 200 includes a prefix field 210, an opcode field 220, and operand specifier fields (e.g., modR/M, scale-index-base, displacement, immediate, etc.). The operand specifier fields are optional and include a modR/M field 230, an SIB field 240, a displacement field 250, and an immediate field 260.

The prefix field 210 includes a number of prefixes. In one embodiment, the prefix field 210 includes up to four prefixes, each prefix is one byte. The prefix field 210 is optional. For the extended new instruction set, however, the prefix field is required to encode the new instructions.

The opcode field 220 specifies the operation. For the extended new instruction set, the opcode field 220 is combined with the prefix field 210 to define an operation. In one embodiment, the opcode field 220 may include one or two bytes.

The combination of the prefix field 210 and the opcode field 220 creates a number of different types of instruction set. For illustrative purposes, FIG. 2 shows only five types of instructions: a regular one-byte instruction 212, a regular instruction with prefix as qualifier 214, a regular escape instruction 216, a first new instruction type 222, and a second new instruction type 224. As is known by one skilled in the art, other types of instruction can be similarly defined.

The regular one-byte instruction 212 includes regular instructions with one-byte opcodes. The regular instruction with prefix as qualifier 214 includes regular instructions which use the prefix as a qualifier for the opcode. For example, a string instruction may use a REPEAT prefix to repeat the string instruction by a number of times specified in the count register or until a certain condition is met. The prefix used in instruction 214 does not add a completely new meaning to the opcode that follows. Rather, the prefix is merely used as a qualifier to qualify the opcode with additional conditions. As will be explained later, the use of the prefix in the instruction 214 is markedly different from that in the instruction 224. The regular escape instruction 216 is a regular instruction that escapes to other types of instruction. For example, in one embodiment, a floating-point coprocessor escape code 0xD8 through 0xDF indicates that the opcode that follows should be interpreted as coprocessor instructions.

The first new instruction type 222 (or the new instruction type 0) is a new instruction that is part of the new instruction set to be added to the existing regular instruction set. The new instruction type 0 uses a special escape code, called a two-byte escape code. In one embodiment, the two-byte escape code is 0x0F. For the instruction 222, the opcode that follows the 2-bye escape code should be decoded as a new instruction. The second new instruction type 224 (or the new instruction type 1) uses the prefix as part of the opcode. Unlike the instruction 214 where the prefix merely qualifies the opcode that follows, the instruction 224 uses the prefix to define a completely new instruction. The use of the prefix together with the escape code enlarges the instruction opcode table without significant changes in the decoding circuitry. In addition, no new opcodes are used so that there is room for new instructions in the future. Examples of these instructions will be given later.

Examples of Instruction Prefixes and Escape Codes

Instruction prefixes are originally developed to enhance a set of instructions. For example, the repeat prefix is developed to repeat a string instruction. The repeat prefix codes are 0xF3 (REP, REPE) and 0xF2 (REPNE). The prefix does not define a new meaning for the opcode that follows. It merely defines additional operational conditions for the opcode.

The escape code provides an extension to the instruction set. For example, the escape codes 0xD8 through 0xDF are used to indicate that the opcode that follows belongs to the floating-point unit. The decoder will pass the opcode to the floating-point decoder. In one embodiment, a two-byte escape code, 0x0F, indicates that the opcode that follows defines a new instruction set. Although the escape code allows enlargement of the instruction set further, the additional number of opcodes is still limited.

The combination of the prefix and the escape code provides a significant enlargement of the opcode table to allow additional new instruction sets. This combination uses the existing prefix codes to define a completely new set of instructions, in addition to the instruction set created by the escape code. By using the existing prefix codes, the decoding circuitry for the existing instruction set remains essentially the same. Although the decoding circuitry will have to be modified to accommodate this combination, the modification is merely a modular add-on with minimal changes to existing design.

The opcodes of some or all of the new instructions may be the same as the opcodes of the existing instructions. By using the same opcodes with the prefix and escape codes to define a brand new set of instructions, the decoding circuitry is much less complex than having a completely new set of opcodes for the new instruction set.

In one embodiment, the repeat prefix 0xF3 is used to define a new instruction set. Other prefixes can be similarly used. Furthermore, prefixes can still be used in the traditional role of enhancing the opcode or qualifying the opcode under some operational condition. For example, the address size prefix can still be used to affect the new instruction with memory operand.

The following are examples of the new instruction set using prefixes and escape codes.

| Instruction | Opcode (in Hex) | Definition |
| --- | --- | --- |
| ADDPS | 0F, 58 | Packed single FP add |
| ADDSS | F3, 0F, 58 | Scalar single FP add |
| CMPPS | 0F, C2 | Packed single FP compare |
| CMPSS | F3, 0F, C2 | Scalar single FP compare |
| DIVPS | 0F, 5E | Packed single FP divide |
| DIVSS | F3, 0F, 5E | Scalar single FP divide |
| MAXPS | 0F, 5F | Packed single FP maximum |
| MAXSS | F3, 0F, 5F | Scalar single FP maximum |
| MINPS | 0F, 5D | Packed single FP minimum |
| MINSS | F3, 0F, 5D | Scalar single FP minimum |
| MOVUPS | 0F, 10/11 | Move unaligned Packed single FP |
| MOVSS | F3, 0F, 10/11 | Move scalar single FP |
| MULPS | 0F, 59 | Packed single FP multiply |
| MULSS | F3, 0F, 59 | Scalar single FP multiply |
| SUBPS | 0F, 5C | Packed single FP subtract |
| SUBSS | F3, 0F, 5C | Scalar single FP subtract |

In the above examples, the instruction set without the prefix 0xF3 relates to operations on packed data, while the instruction set with the prefix 0xF3 relates to operations on scalar data.

In one embodiment, the set of prefix codes are: an address size prefix code (0x67), an operand size prefix code (0x66), a segment override prefix code (0x2E, 0x36, 0x3E, 0x26, 0x64, 0x65), a repeat prefix code (0xF3), a repeat while equal prefix code (0xF3), a repeat while not equal code (0xF2), and a lock prefix code (0xF0). As is known by one skilled in the art, the exact codes for these prefixes are implementation-dependent, the above prefix codes are merely for illustrative purposes. Furthermore, not all the prefix codes are available for encoding the new instruction set. Some prefixes may result in illegal mode or may not be recognized.

Instruction Decoding Using Prefixes

Figure 3:
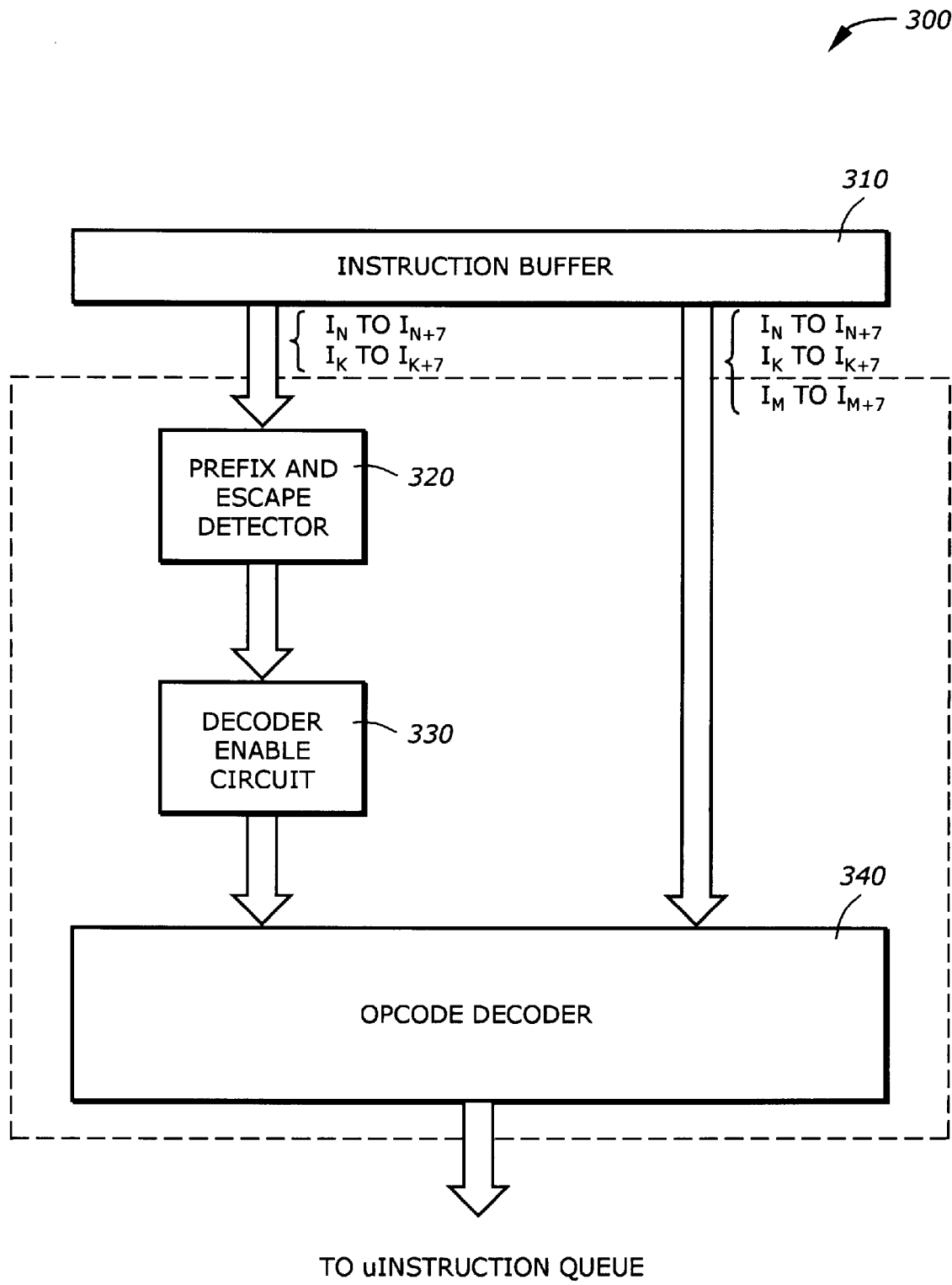
FIG. 3 is a diagram illustrating a circuit 300 to decode the instruction according to one embodiment of the invention.

FIG. 3 is a diagram illustrating a circuit 300 to decode the instruction. The circuit 300 includes an instruction buffer 310, a prefix and escape detector 320, a decoder enable circuit 330, and an opcode decoder 340. The prefix and escape detector 320, the decoder enable circuit 330, and the opcode decoder 340 form a portion of the decode unit 116 in FIG. 1.

The instruction buffer 310 stores the instructions fetched from the external memory. Typically, the instruction buffer 310 is implemented as an instruction cache. For illustrative purposes, an instruction is assumed to comprise three bytes: The first byte corresponds to $I_N$ to $I_{N+7}$, the second byte corresponds to $I_K$ to $I_{K+7}$, and the third byte corresponds to $I_M$ to $I_{M+7}$, where $I_N$ to $I_{N+7}$, $I_K$ to $I_{K+7}$, and $I_M$ to $I_{M+7}$ refer to the bit positions of the instruction word.

The prefix and escape detector 320 receives the instruction bits $I_N$ to $I_{N+7}$, $I_K$ to $I_{K+7}$, and detects a set of predefined prefixes and/or escape codes used as part of the new instruction set. The values of these prefixes are selected so that they are the same as those prefixes that are used for the regular instruction set. The decoder enable circuit 330 combines the results of the prefix and escape detector 320 to generate enable or select signals to the individual opcode decoder. The opcode decoder 340 receives the instruction bits $I_N$ to $I_{N+7}$, $I_K$ to $I_{K+7}$, and $I_M$ to $I_{M+7}$ and performs the decoding function for the individual types of instructions.

Figure 4:
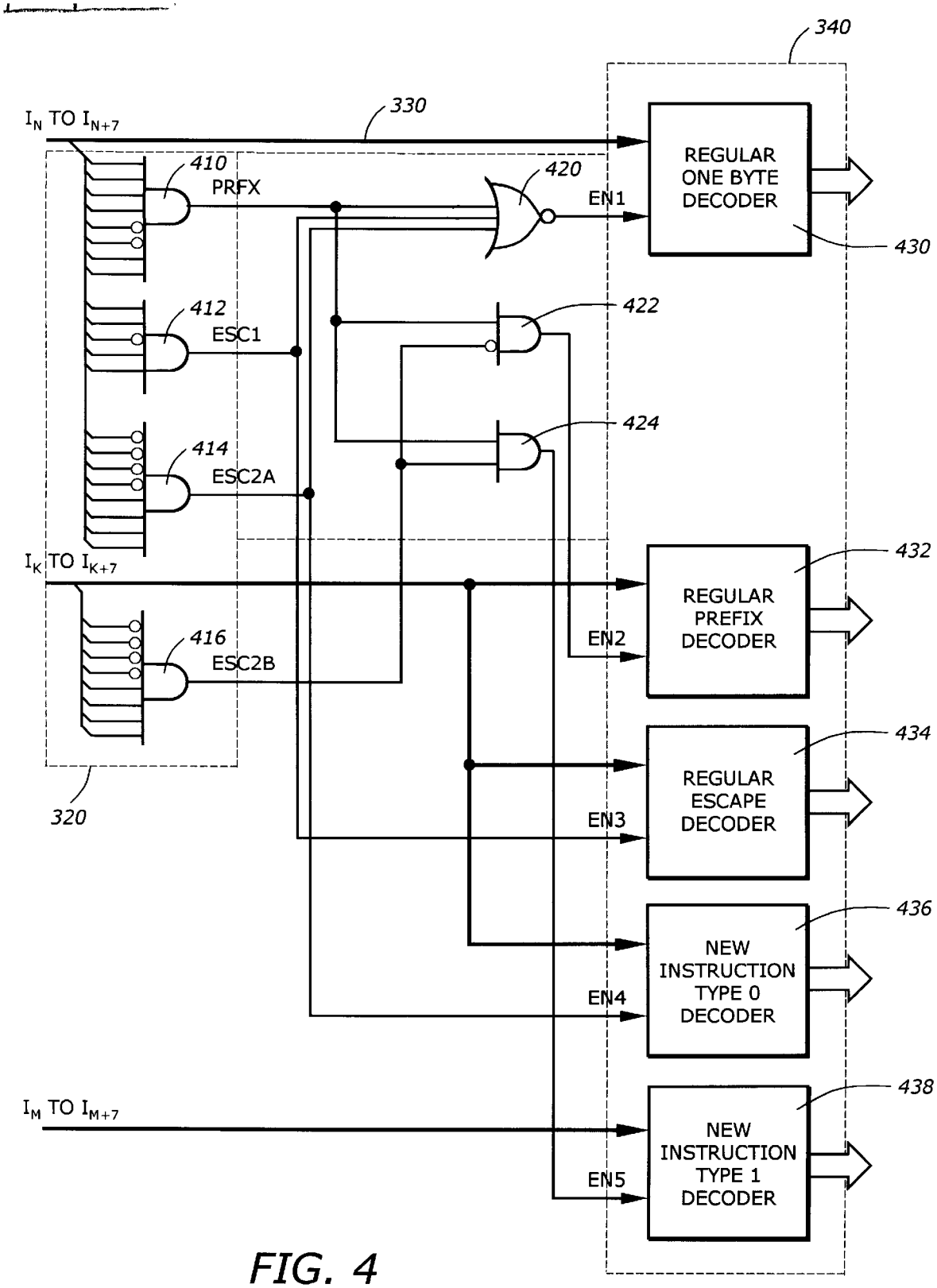
FIG. 4 is a diagram illustrating the prefix and escape detector 320, the decoder enable circuit 330, and the opcode decoder 340 according to one embodiment of the invention.

FIG. 4 is a diagram illustrating the prefix and escape detector 320, the decoder enable circuit 330, and the opcode decoder 340. For illustrative purposes, it is assumed that there is one 0xF3 prefix, and two escape codes, the 0xD8-0xDF and 0x0F.

The prefix and escape detector 320 includes 4 AND gates 410, 412, 414, and 416. The AND gates 410, 412, and 414 match the instruction bits $I_N$ to $I_{N+7}$ with the corresponding prefix code and escape code. The AND gate 410 matches the instruction bits $I_N$ to $I_{N+7}$ with the prefix code, 0xF3, and generates a signal PRFX. The signal PRFX is asserted if the instruction bits $I_N$ to $I_{N+7}$ represent the prefix 0xF3. The AND gate 412 matches the instruction bits $I_N$ to $I_{N+7}$ with the escape code, 0xD8-0xDF, and generates a signal ESC1. The signal ESC1 is asserted if the instruction bits $I_N$ to $I_{N+7}$ represent the escape code 0xD8 to 0xDF. The AND gate 414 matches the instruction bits $I_N$ to $I_{N+7}$ with the 2-byte escape code, 0x0F, and generates a signal ESC2A. The signal ESC2A is asserted if the instruction bits $I_N$ to $I_{N+7}$ represent the 2-byte escape code 0x0F. The AND gate 416 matches the instruction bits $I_K$ to $I_{K+7}$ with the 2-byte escape code, 0x0F, and generates a signal ESC2B. The signal ESC2B is asserted if the instruction bits $I_K$ to $I_{K+7}$ represent the 2-byte escape code 0x0F. As is known by one skilled in the art, other logic gates can be employed to perform the matching or decoding of the instruction bits $I_N$ to $I_{N+7}$ and $I_K$ to $I_{K+7}$.

The decoder enable circuit 330 receives the PRFX, ESC1, ESC2A, and ESC2B signals to generate the enable signals to the individual decoders. The decoder enable circuit 330 includes a NOR gate 420, an AND gate 422, and an AND gate 424.

The NOR gate 420 asserts the EN1 signal when all the PRFX, ESC1, and ESC2A are negated. This condition corresponds to the condition where the instruction bits $I_N$ to $I_{N+7}$ do not match a prefix, a floating-point escape code, and a 2-byte escape code. Therefore, the instruction bits $I_N$ to $I_{N+7}$ correspond to an opcode of a one-byte regular instruction.

The AND gate 422 asserts the EN2 signal when the PRFX signal is asserted and the ESC2B is negated. This condition corresponds to the condition where the instruction bits $I_N$ to $I_{N+7}$ match the prefix code but the instruction bits $I_K$ to $I_{K+7}$ do not match the 2-byte escape code. Therefore this condition corresponds to an opcode using the prefix as a qualifier of a regular instruction.

The ESC1 signal is used as the EN3 signal. This signal is asserted when the instruction bits $I_N$ to $I_{N+7}$ match the floating-point escape code. Therefore this condition corresponds to a floating-point opcode of a regular instruction.

The ESC2A signal is used as the EN4 signal. This signal is asserted when the instruction bits $I_N$ to $I_{N+7}$ match the 2-byte escape code. Therefore this condition corresponds to an opcode of a new instruction type 0.

The AND gate 424 asserts the EN5 signal when the PRFX and ESC2B signals are asserted. This condition corresponds to the condition where the instruction bits $I_N$ to $I_{N+7}$ match the prefix code and the instruction bits $I_K$ to $I_{K+7}$ match the 2-byte escape code. Therefore this condition corresponds to an opcode of a new instruction type 1.

The opcode decoder 340 includes a regular one-byte decoder 430, a regular prefix decoder 432, a regular escape decoder 434, a new instruction type 0 decoder 436, and a new instruction type 1 decoder 438. These decoders essentially perform the decoding functions for the instruction as specified by the instruction opcodes in instruction bits $I_N$ to $I_{N+7}$ and $I_K$ to $I_{K+7}$. Although these decoders are shown in separate blocks, in practice the decoding of these instructions are combined.

Figure 5:
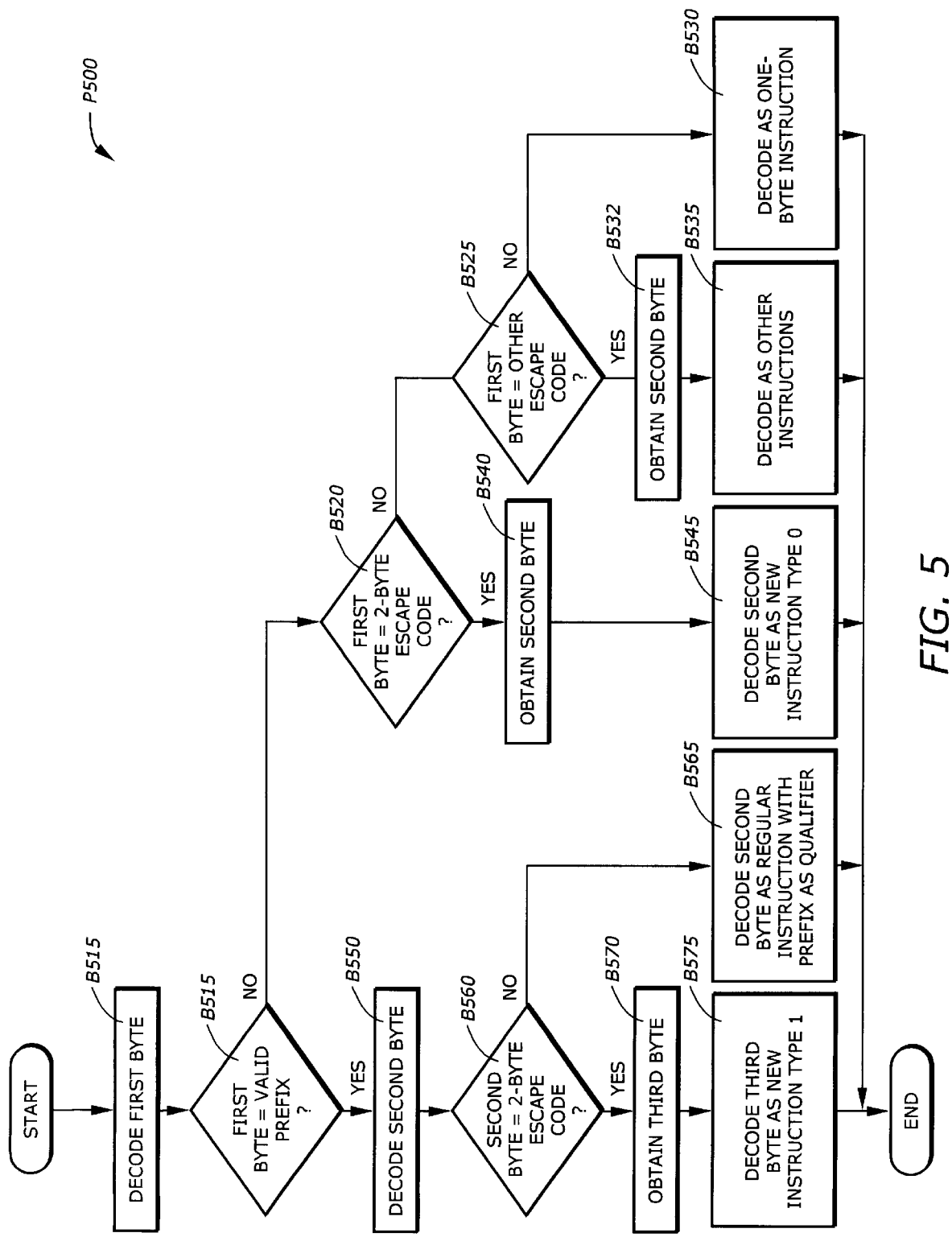
FIG. 5 is a flowchart illustrating a process P500 to perform instruction decoding using prefixes according to one embodiment of the invention.

FIG. 5 is a flowchart illustrating a process P500 to perform instruction decoding using prefixes.

At START, the process P500 enters block B510 to decode the first byte, or the instruction bits $I_N$ to $I_{N+7}$. Then the process P500 enters block B515 to determine if the first byte is a valid prefix code (e.g., 0xF3). If NO, the process P500 enters block B520. If YES, the process P500 enters block B550.

At block B520, the process P500 determines if the first byte is a 2-byte escape code. If NO, the process P500 enters block B525. If YES, the process P500 enters block B540. At block B525, the process P500 determines if the first byte is other escape code (e.g., floating-point escape code). If NO, the process P500 enters block B530 to decode the first byte as a one-byte regular instruction. If YES, the process P500 enters block B532 to obtain the second byte and then to block B535 to decode the second byte as other regular instructions (e.g., floating-point instructions). The process P500 then terminates.

At block B540, the process P500 obtains the second byte and enters block B545 to decode the second byte as a new instruction type 0 (e.g., packed data instructions). The process P500 then terminates.

At block B550, the process P500 decodes the second byte, or the instruction bits $I_K$ to $I_{K+7}$. The process P500 then enters block B560 to determine if the second byte is a 2-byte escape code. If NO, the process P500 enters block B565 to decode the second byte as an opcode of a regular instruction with the prefix as a qualifier. If YES, the process P500 enters block B570 to obtain the third byte and then block B575 to decode the third byte as a new instruction type 1 (e.g., scalar instructions). The process P500 then terminates.

The present invention provides an efficient method to encode a new instruction set using existing prefixes. The present invention therefore allows the new instruction set to be as large as necessary without complicating the instruction decoder.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for encoding a first instruction in an instruction set, the instruction set using a prefix code to qualify an existing opcode of an existing instruction, the method comprising:

selecting a first opcode;

selecting an escape code, the escape code being different from the prefix code and the existing opcode; and combining the first opcode, the escape code, and the prefix code to generate a first instruction code, the first instruction code uniquely representing a first operation performed by the first instruction.

2. The method of claim 1 further comprises:

combining the first opcode and the escape code to generate a second instruction code, the second instruction code uniquely representing a second operation performed by a second instruction.

3. The method of claim 1 wherein the prefix code is one of an address size prefix code (0x67), an operand size prefix code (0x66), a segment override prefix code (0x2E, 0x36, 0x3E, 0x26, 0x64, 0x65), a repeat prefix code (0xF3), a repeat while equal prefix code (0xF3), a repeat while not equal code (0xF2), and a lock prefix code (0xF0).

4. The method of claim 1 wherein the escape code is 0x0F.

5. The method of claim 1 wherein the first operation is a scalar operation.

6. The method of claim 2 wherein the second operation is a packed data operation.

7. A method for decoding an instruction code, the instruction code having a plurality of fields, the method comprising:

determining if a first field matches a prefix code;

if the first field matches the prefix code, determining if a second field matches an escape code; and if the second field matches the escape code, translating a third field into a first decoded instruction code, the first decoded instruction code uniquely representing a first operation performed by a first instruction.

8. The method of claim 7 further comprises:

if the first field does not match the prefix code, determining if the first field matches the escape code;

if the first field matches the escape code, translating the second field into a second decoded instruction code, the second decoded instruction code uniquely representing a second operation performed by a second instruction.

9. The method of claim 7 wherein the prefix code is one of an address size prefix code (0x67), an operand size prefix code (0x66), a segment override prefix code (0x2E, 0x36, 0x3E, 0x26, 0x64, 0x65), a repeat prefix code (0xF3), a repeat while equal prefix code (0xF3), a repeat while not equal code (0xF2), and a lock prefix code (0xF0).

10. The method of claim 7 wherein the escape code is 0x0F.

11. The method of claim 7 wherein the first operation is a scalar operation.

12. The method of claim 8 wherein the second operation is a packed data operation.

13. An apparatus for decoding an instruction code issued from an instruction buffer, the instruction code having a plurality of fields, the apparatus comprising:

a prefix detector coupled to the instruction buffer to receive the instruction code and to detect if a first field of the instruction code matches a prefix code;

an escape detector coupled to the instruction buffer to receive the instruction code and to detect of a second field of the instruction code matches an escape code; and an opcode decoder coupled to the instruction buffer to receive the instruction code and to translate one of the first field, the second field, and a third field of the instruction code into a decoded instruction code.

14. The apparatus of claim 13 further comprises:

a decoder enable circuit coupled to the prefix detector and the escape detector to generate enable signals to enable the opcode decoder.

15. The apparatus of claim 13 wherein the prefix code is one of an address size prefix code (0x67), an operand size prefix code (0x66), a segment override prefix code (0x2E, 0x36, 0x3E, 0x26, 0x64, 0x65), a repeat prefix code (0xF3), a repeat while equal prefix code (0xF3), a repeat while not equal code (0xF2), and a lock prefix code (0xF0).

16. The apparatus of claim 13 wherein the escape code is 0x0F.

17. The apparatus of claim 13 wherein the opcode decoder translates the third field into a first decoded instruction code if the first field matches a prefix code and the second field matches the escape code, the first decoded instruction code uniquely representing a first operation performed by a first instruction.

18. The apparatus of claim 13 wherein the opcode decoder translates the second field into a second decoded instruction code if the first field matches the escape code, the second decoded instruction code uniquely representing a second operation performed by a second instruction.

19. The apparatus of claim 17 wherein the first operation is a scalar operation.

20. The apparatus of claim 18 wherein the second operation is a packed data operation.

* * * * *